(12) United States Patent
Minemoto (10) Patent No.: US 6,927,909 B2
(45) Date of Patent: Aug. 9, 2005

(54) INTEGRATED MAGNETO-OPTICAL MODULATOR WITH OPTICAL ISOLATOR, METHOD OF MANUFACTURING THE SAME AND OPTICAL COMMUNICATION SYSTEM USING THE SAME

(75) Inventor: Hisashi Minemoto, Otsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 162 days.

(21) Appl. No.: 10/431,533

(22) Filed: May 8, 2003

(65) Prior Publication Data

US 2003/0218792 A1 Nov. 27, 2003

(30) Foreign Application Priority Data

May 9, 2002 (JP) ......................................... 2002-134194

(51) Int. Cl.[7] .............................. G02B 27/28; G02F 1/09
(52) U.S. Cl. ........................ 359/484; 359/497; 359/500; 359/501; 359/282; 359/283; 359/284
(58) Field of Search ................................ 359/280–284, 359/301, 484, 497, 500, 501

(56) References Cited

U.S. PATENT DOCUMENTS

| | | | |
|---|---|---|---|
| 3,495,189 A | 2/1970 | Le Craw | 359/283 |
| 4,136,350 A | 1/1979 | Tien | 257/14 |
| 4,810,065 A * | 3/1989 | Valette et al. | 359/281 |
| 5,598,492 A | 1/1997 | Hammer | 385/27 |
| 6,141,140 A | 10/2000 | Kim | 359/281 |
| 6,359,722 B1 * | 3/2002 | Inoue et al. | 359/281 |
| 6,542,647 B2 * | 4/2003 | Minemoto et al. | 359/280 |
| 2003/0184841 A1 * | 10/2003 | Minemoto | 359/280 |

FOREIGN PATENT DOCUMENTS

| | | |
|---|---|---|
| EP | 1 202 105 A | 5/2002 |
| JP | 3-144417 | 6/1991 |
| JP | 4-172261 | 6/1992 |
| JP | 7-199137 | 8/1995 |
| JP | 10-186189 | 7/1998 |
| JP | 2001-272639 | 10/2001 |

OTHER PUBLICATIONS

Nishihara et al., Optical Integrated Circuit, pp. 298–304, 1985 Ohm–sha.
J. Appl. Phys. vol. 76 No. 3 pp. 1405–1408 (1994), "Estimation of direct current bias and drift of Ti:LiNbO$_3$ optical modulators".

(Continued)

Primary Examiner—Evelyn A. Lester
(74) Attorney, Agent, or Firm—Louis Woo (57) ABSTRACT

The integrated magneto-optical modulator with optical isolator of the present invention comprises an optical isolator unit, a magneto-optical modulator unit, an impedance adjuster. The optical isolator unit rotates a polarization of an incident light from a light source to transmit the light with rotated polarization, and eliminates a reflected feedback light toward the light source. The magneto-optical modulator unit modulates an intensity of the light from the optical isolator unit and transmitting the modulated light outside. The impedance adjuster adjusts electrical impedance at the magneto-optical modulator unit in order to effectively introduce the high-frequency signal for light modulation to the magneto-optical modulator unit. Further, the optical isolator unit and the magneto-optical modulator unit are contained a single package.

20 Claims, 10 Drawing Sheets

OTHER PUBLICATIONS

Appl. Phys. Lett. vol. 21 No. 8 pp. 394–396 (1972), "Switching and modulation of light in magneto–optic waveguides of garnet films".

Appl. Phys. Lett. vol. 68 No. 25 pp. 3546–3548 (1996), "Ultrafast magneto–optic sampling of picosecond current pulses".

61th JJAP Transaction, lecture No. 4p–Q–4 (2000), "Sensitivity improvement of fiber edge magneto–optic probe by applying a transverse DC magnetic field".

J. Appl. Phys. vol. 53 No. 11 pp. 8263–8265 (1982), "A sensitive and compact magnetometer using Faraday effect in YIG waveguide".

National Technical Report vol. 38 No. 2 pp. 127–133 (1992), "Fiber–Optic Monitoring Sensor System for Power Distribution Lines".

J. Smit et al, "Ferrities" Cleaver–Hume Press, 1959 pp. 269–300.

* cited by examiner

NON-MAGNETIC GARNET SUBSTRATE PREPARED

FIG. 4B

MAGNET-OPTICAL ELEMENT GROWN

FIG. 4C

A STRIP LINE AND A FLAME FORMED

FIG. 4D

A POLARIZER AND A ANALYZER ADHESIVELY FIXED

FIG. 4E

PERSPECTIVE VIEW OF FIG. 4D

INTEGRATED MAGNETO-OPTICAL MODULATOR WITH OPTICAL ISOLATOR, METHOD OF MANUFACTURING THE SAME AND OPTICAL COMMUNICATION SYSTEM USING THE SAME

BACKGROUND OF THE INVENTION

1. Field of the Invention

The present invention relates to an integrated magneto-optical modulator with optical isolator that integrates an optical isolator used by optical communication and an optical modulator modulating light by utilizing the magneto-optical effect, a process of manufacturing the same, and an optical communication system using the same.

2. Description of the Related Art

An electro-optic modulator such as a Pockels cell has been widely employed in conventional optical communication systems. Particularly, a wave-guide optical modulator utilizing an electro-optic effect of the $LiNbO_3$ crystal is a typical one (Nishihara et al., Optical Integrated Circuit, pp. 298–304, 1985, Ohm-sha). However, the optical modulator using the electro-optic crystal has a disadvantage that it suffers from the DC drift (J. Appl. Phys. Vol. 76 No. 3 pp. 1405–1408, 1994) and optical damage. Therefore, it is difficult to operate it stably for a long time period, or it costs much to avoid deterioration in its characteristics.

On the other hand, although a magneto-optical modulator has been studied for a long time (Appl. Phys. Lett. Vol. 21 No. 8 pp. 394–396, 1972), development thereof is not being well advanced, due to its response speed slower than that of the electro-optic modulator. The conventional magneto-optical modulator employed in an optical communication system disclosed in JP7-199137A responds to no higher than several tens kHz.

Recently, a magneto-optical modulator wherein a DC bias magnetic field is applied to a magneto-optical crystal has been studied in order to measure an electric current in a semiconductor electronic circuit substrate (Appl. Phys. Lett. Vol. 68 No. 25 pp. 3546–3548, 1996, and 61st JJAP Transaction, lecture No. 4p-Q-4, 2000). Furthermore, an optical isolator is used for a magneto-optical modulator (U.S. Pat. No. 6,141,140 or JP3-144417A). Furthermore, both a function of optical modulation and a function of optical isolation can be achieved by using a single magneto-optical element with magnetostatic wave (JP2001-272639A).

However, there are being used, in almost all of the conventional optical communication systems, a direct high speed modulation of the electric current in the semiconductor laser and a wave-guide optical modulator utilizing the electro-optic effect (Pockels effect). Although the direct modulation of the semiconductor laser has an advantage that the optical communication system does not need any other modulators and therefore, its structure becomes simple, the modulation frequency is generally no higher than several GHz. Furthermore, when a semiconductor laser is driven by the high-frequency signal, the drive circuit becomes highly advanced and a transmission distance through the optical fiber of the optical signal is limited by the wavelength chirping.

On the other hand, the electro-optic modulator, particularly the wave-guide optical modulator using the Pockels effect has advantages that it is suitable for a high speed modulation of a laser or LED light and that it is free from a wave-length variation or wave-length chirping which is caused by a direct modulation of a semiconductor laser. However, the electro-optic modulator has a disadvantage that it has a DC drift and optical damage which increase a production cost in order to countermeasure against the disadvantage.

Furthermore, there is a magneto-optical modulator for monitoring an electric current wave form on a micro strip line, by disposing the magneto-optic crystal directly on a semiconductor substrate or micro strip line and by applying a DC bias magnetic field to the magneto-optic crystal (Appl. Phys. Lett. Vol. 68 No. 25 pp. 3546–3548, 1996). However, the above-mentioned current monitoring has a disadvantage that the current wave form is distorted by a ringing due to impedance mismatching between the line and the modulation signal generator, and the above-mentioned current monitoring device (electric current wave monitor) does not include any optical fiber and therefore, is not suitable for the optical communication systems.

On the other hand, another magneto-optic modulator for monitoring the current wave form on the micro strip line wherein an analyzer is disposed after passing a short, e.g., shorter than approximately 1 m, optical fiber (61st JJAP Transaction, Lecture No. 4p-Q-4, 2000). However, a linear polarization becomes in general a random polarization through a long optical fiber. Therefore, the intensity modulation of light propagating through a long optical fiber can not be achieved even by using the analyzer. Further, in the above-mentioned another magneto-optical modulator, the DC bias magnetic field is almost parallel to the high frequency magnetic field. Therefore, the above-mentioned another magneto-optic modulator has a disadvantage that the magneto-optical modulator is magnetically saturated under a large bias magnetic field for obtaining a single magnetic domain and the magnetic saturation greatly reduces or completely extinguishes the modulated signal.

Figure 7A:
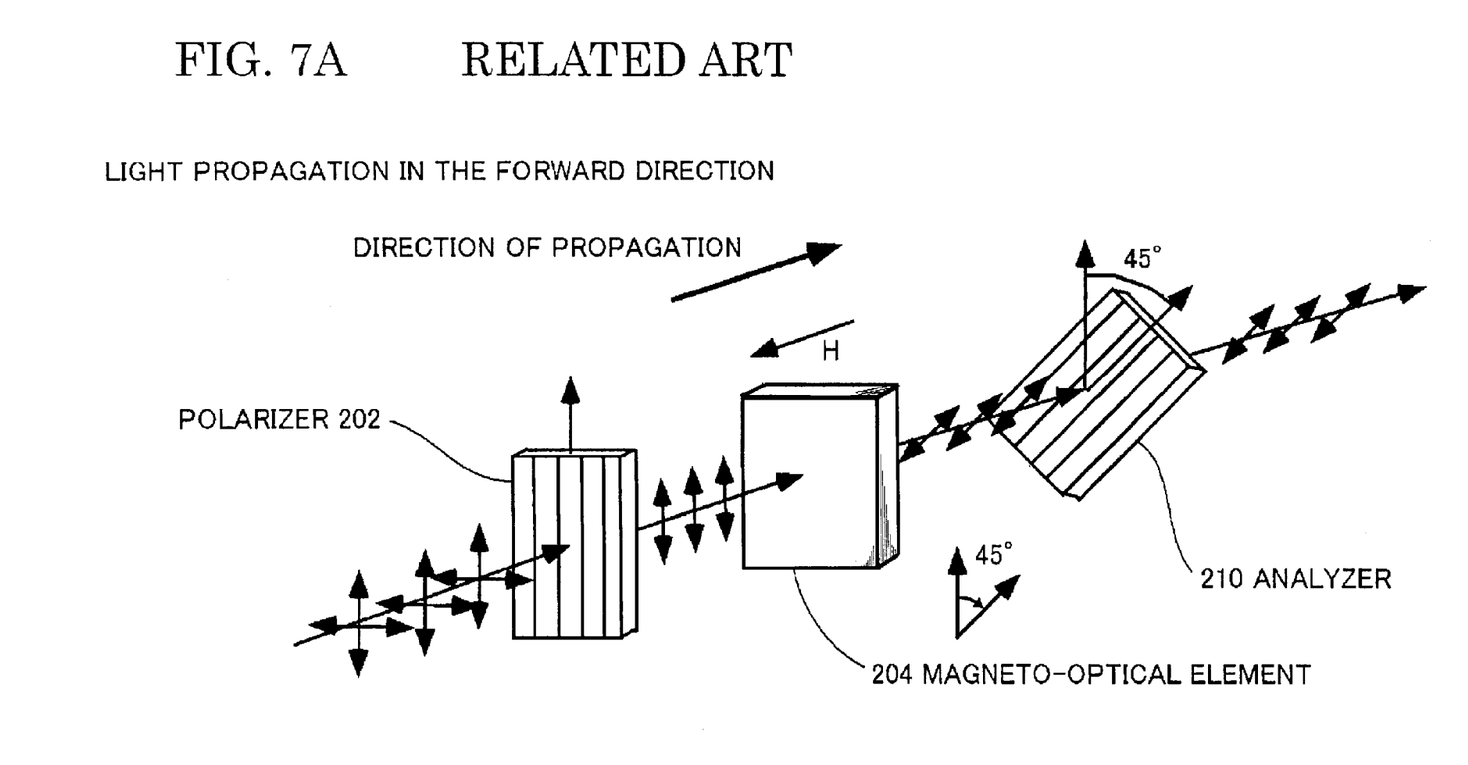
FIG. 7A is a perspective view showing the light propagation from the light source side toward the system side.

Moreover, there is a significant problem that light returns in the direction toward light source where light propagation must be blocked by the optical isolator when an optical isolator is employed as an optical modulator and the polarization of light rotates with the magneto-optical effect (Faraday effect) being generated by an external magnetic field. In this case, the optical modulator does not perform as an optical isolator at all. Above-mentioned problem will be described in detail, referring to FIGS. 7A, 7B and 8. The incident light propagates through a polarizer 202 from the light source side as shown in FIG. 7A, and only the light, that corresponds to the polarization plane of the polarizer 202, penetrates. And then, the transmitted light through the polarizer 202 is inputted into a magneto-optical element 204 and the plane of polarization rotates by 45° during propagating through it. The analyzer 210 can completely transmit the light to the system side, because the plane of polarization which the analyzer can transmit is equal to the plane of polarization rotated by the polarizer 202. Therefore, the incident light in the forward direction can ideally propagate without loss if the polarization orientation of both of the polarizer 202 and the analyzer 210 is properly set.

Figure 7B:
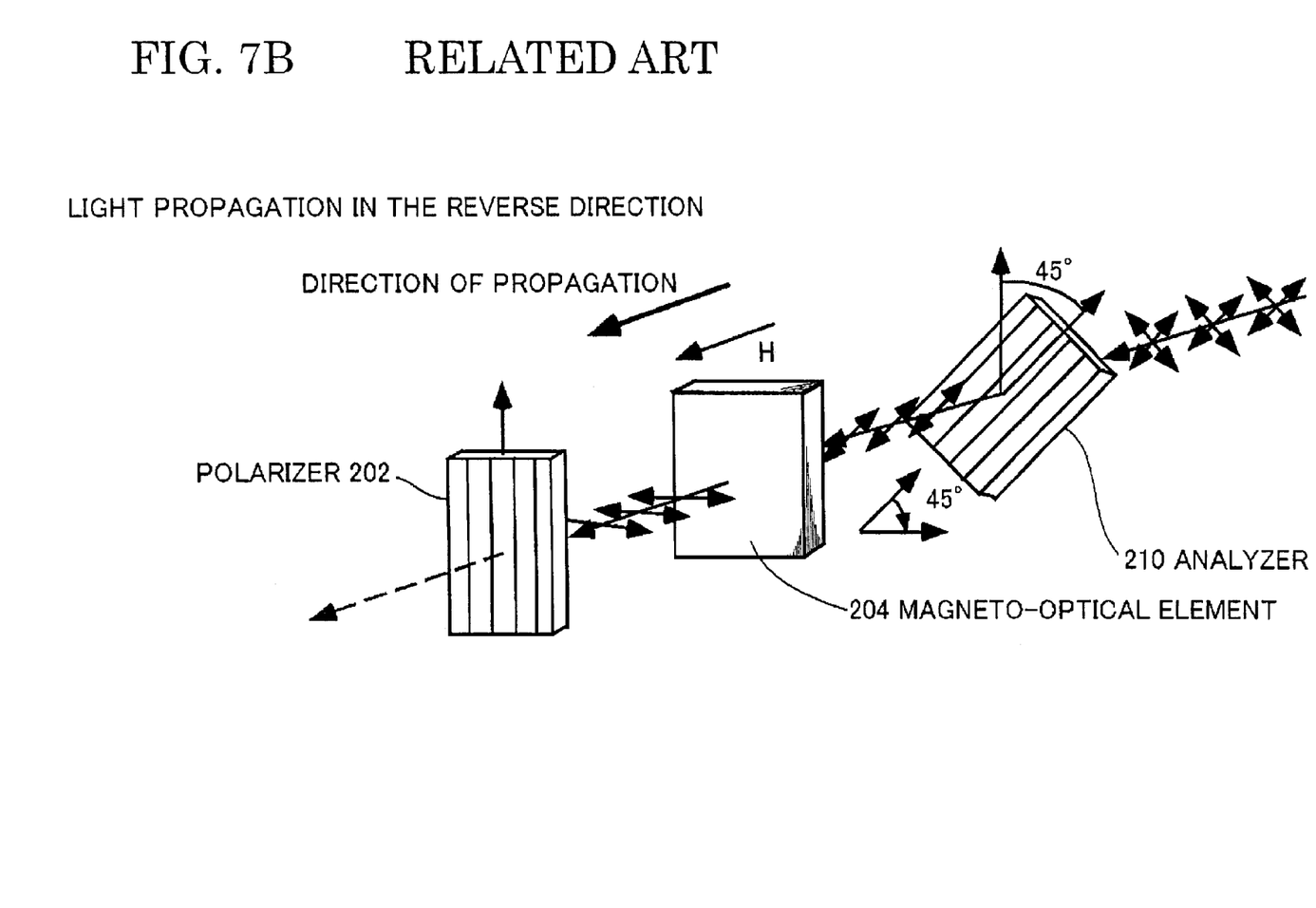
FIG. 7B is a perspective view showing the light propagation from the system side toward the light source side.

On the other hand, when light in the reverse direction is introduced from the system side, the analyzer 210 transmits the light with just the same plane of polarization as the polarization orientation of the analyzer 210. And then, the transmitted light through the analyzer 210 is inputted into a magneto-optical element 204 and the plane of polarization rotates by 45° during propagating through it. The rotation direction of the polarization is always the same regardless of the forward or reverse direction. As the polarization of the penetrating light through the magneto-optical element 204 is absolutely perpendicular to the polarization orientation of the analyzer 202, the reflected feedback light can not return toward the light source at all. This structure can be called an optical diode because light can propagate in the one-way direction (the forward direction). However, above-mentioned operation will be achieved when the rotation angle of the polarization due to Faraday effect at the magneto-optical element 204 is strictly 45°. That means, if the rotation angle thereof slightly shifts from 45°, the polarization of the reflected feedback light through the magneto-optical element 204 is not absolutely perpendicular to the plane of polarization at the analyzer 202, and the reflected feedback light slightly returns toward the light source. In the particular case of using an optical modulator as an optical isolator, the Faraday rotation angle at the magneto-optical element 204 needs to shift from 45° because the magneto-optical element 204 must execute the light modulation. The greater the shift of angle is, the more the reflected feedback light returns toward the light source.

Figure 8:
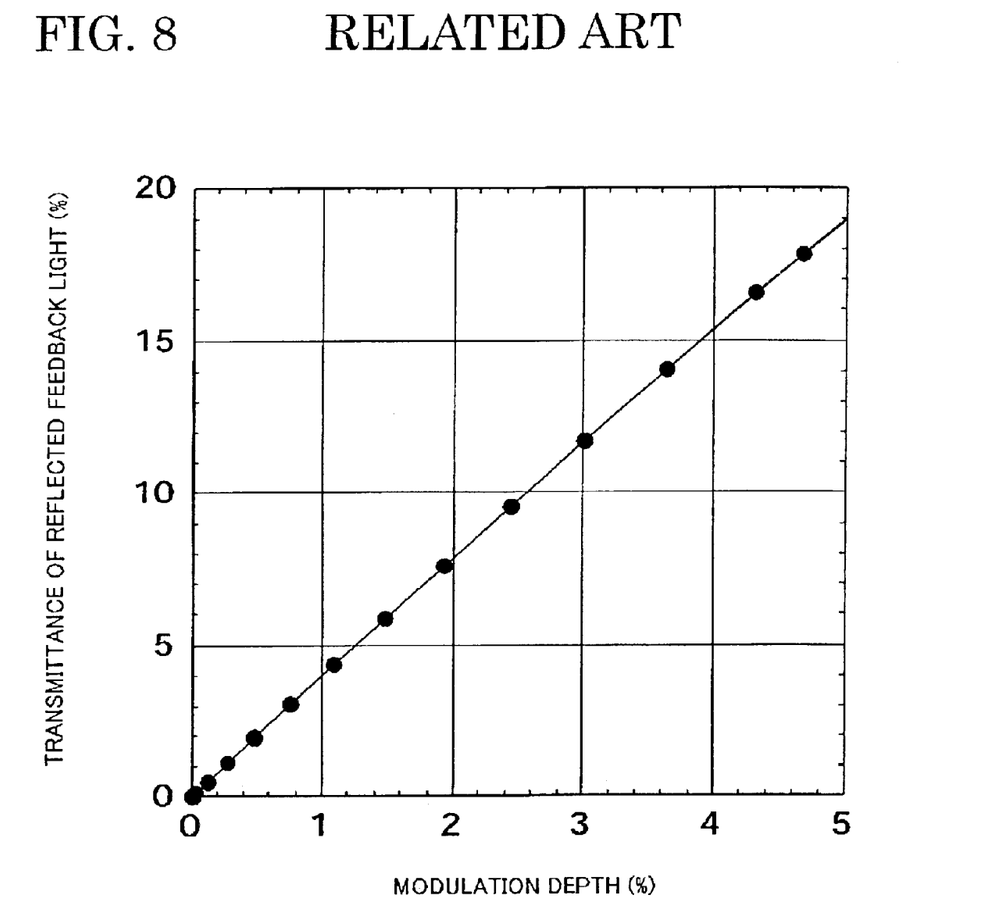
FIG. 8 shows a graph of the relationship between modulation depth and transmittance of reflected feedback light when an optical isolator is used as an optical modulator.

FIG. 8 shows a graph of the relationship between modulation depth and transmittance of reflected feedback light when an optical isolator is used as an optical modulator. An usual optical isolator should function so that light transmittance in the reverse direction may become 0.1% or less (0.001% or less according to the usage). However, it has been known that the reflected feedback light returns to the light source by approximately as much as 10%–20% even if modulation depth becomes a few percentages as shown in FIG. 8, and the optical isolator does not carry out the function of optical isolation at all. So far, it was not considered at all that the function as the optical isolator was remarkably deteriorated like this when the optical isolator was employed as the optical modulator. In addition, an optical isolator may be covered with a metal package, and the magnet of the rare earth metal may be used in an optical isolator. Therefore, there is also the problem that the high-frequency magnetic field for modulation can not be effectively applied to the magneto-optical element by the influence of the eddy current when the high-frequency magnetic field is applied from the exterior of the optical isolator.

Furthermore, there is a problem when the magneto-optical modulator using the magnetostatic wave and the optical isolator are composed of a single element (JP2001-272639A), a broadband communication such as an optical communication can not be achieved because the magnetostatic wave is excited only by a narrow frequency bandwidth. In the same case, there is also another problem that the optical isolator can not efficiently block the reflected feedback light and the reflected feedback light returns more toward the light source when the depth of modulation in the optical modulator becomes greater.

SUMMARY OF THE INVENTION

The present invention has been made to solve the above-mentioned problems. An object of the present invention is to provide an integrated magneto-optical modulator with optical isolator which operates in wide frequency range and performs high speed modulation.

The present invention provides an integrated magneto-optical modulator with optical isolator which comprises an optical isolator unit for rotating a polarization of an incident light from a light source to transmit the light with rotated polarization, and for eliminating a reflected feedback light toward the light source, a magneto-optical modulator unit for modulating an intensity of the light from the optical isolator unit and transmitting the modulated light outside, an impedance adjuster for adjusting an electrical impedance in order to effectively introduce a high-frequency signal for light modulation to the magneto-optical modulator unit, and a single package for containing the optical isolator unit and the magneto-optical modulator unit.

The present invention also provides a method of manufacturing a integrated magneto-optical modulator with optical isolator, which consists of at least a optical isolator unit and a magneto-optical modulator unit, which comprises the steps of making rare earth iron garnet crystal grown on non-magnetic garnet substrate, forming a groove almost perpendicular to a direction of a propagation path of the light, and inserting a optical component for rotating a polarization direction of light into the groove.

The present invention also provides an optical communication system comprising, a light source for inputting a light into the optical isolator, a light source drive circuit for driving the light source, an optical isolator unit for rotating a polarization of an incident light from the light source and transmitting the light with rotated polarization, while for eliminating a reflected feedback light toward the light source, a magneto-optical modulator unit for modulating an intensity of the light from the optical isolator unit and transmitting the modulated light outside, a magneto-optical modulation drive circuit for processing a high-frequency signal for light modulation at the magnet-optical modulator unit, an impedance adjuster for adjusting an electrical impedance in order to effectively introduce the high-frequency signal for light modulation to the magneto-optical modulator unit, an optical fiber for propagating an outputted light from the magneto-optical modulator unit, a photodetector for detecting the light propagating through the optical fiber, and a signal processing circuit for executing the signal decoding process to take out the desired information from the optical signal of the received light by the photodetector.

DETAILED DESCRIPTION OF THE PREFERRED EMBODIMENTS

Hereinafter, the embodiments of the present invention will be described, referring to the accompanying drawings. The integrated magneto-optical modulator with optical isolator of the present invention contains a magneto-optical modulator of possible high speed modulation and an optical isolator in a single package, or is the one that the magneto-optical modulator of possible high speed modulation and an optical isolator are arranged in face-to-face contact fashion.

The magneto-optical modulator possibly responds to the level of the frequency of the FMR (FerroMagnetic Resonance), that is 10 GHz–100 GHz or more, by applying the bias magnetic field to the magneto-optic material and making it have the single ferromagnetic domain, for instance as indicated in Appl. Phys. Lett. Vol. 68 No. 25 pp. 3546–3548, 1996. On the other hand, an intense fluctuation of the light source generally causes the noise in the optical communication system of the high speed optical modulation due to the reflected feedback light from various optical components arranged on the optical transmission line such as connectors, couplers, and filters to the light source. It is easy to contain the magneto-optical modulator and the optical isolator in a single package because they can be made of a similar magneto-optical element respectively. It is also easy that the magneto-optical modulator unit and the optical isolator unit can be arranged in face-to-face contact fashion for the same reason. Moreover, using a single or a couple of magnetic field generators for a bias magnetic field, a proper strength of the bias magnetic field can be applied to both the optical isolator unit and the magneto-optical modulator unit. In addition, low frequency resonance arises at 100 MHz–1000 MHz due to the wandering of magnetic domains when using the magneto-optical element which has multiple magnetic domains without the bias magnetic field, and thus, if the bias magnet field is not applied, the magneto-optical element can not response at the larger frequency than the resonance frequency and execute the high speed modulation of light. Therefore, the bias magnet field must be applied to this magneto-optical element. Furthermore, the integrated magneto-optical modulator with optical isolator of the present invention will be described hereinafter.

<First Embodiment>

Figure 1:
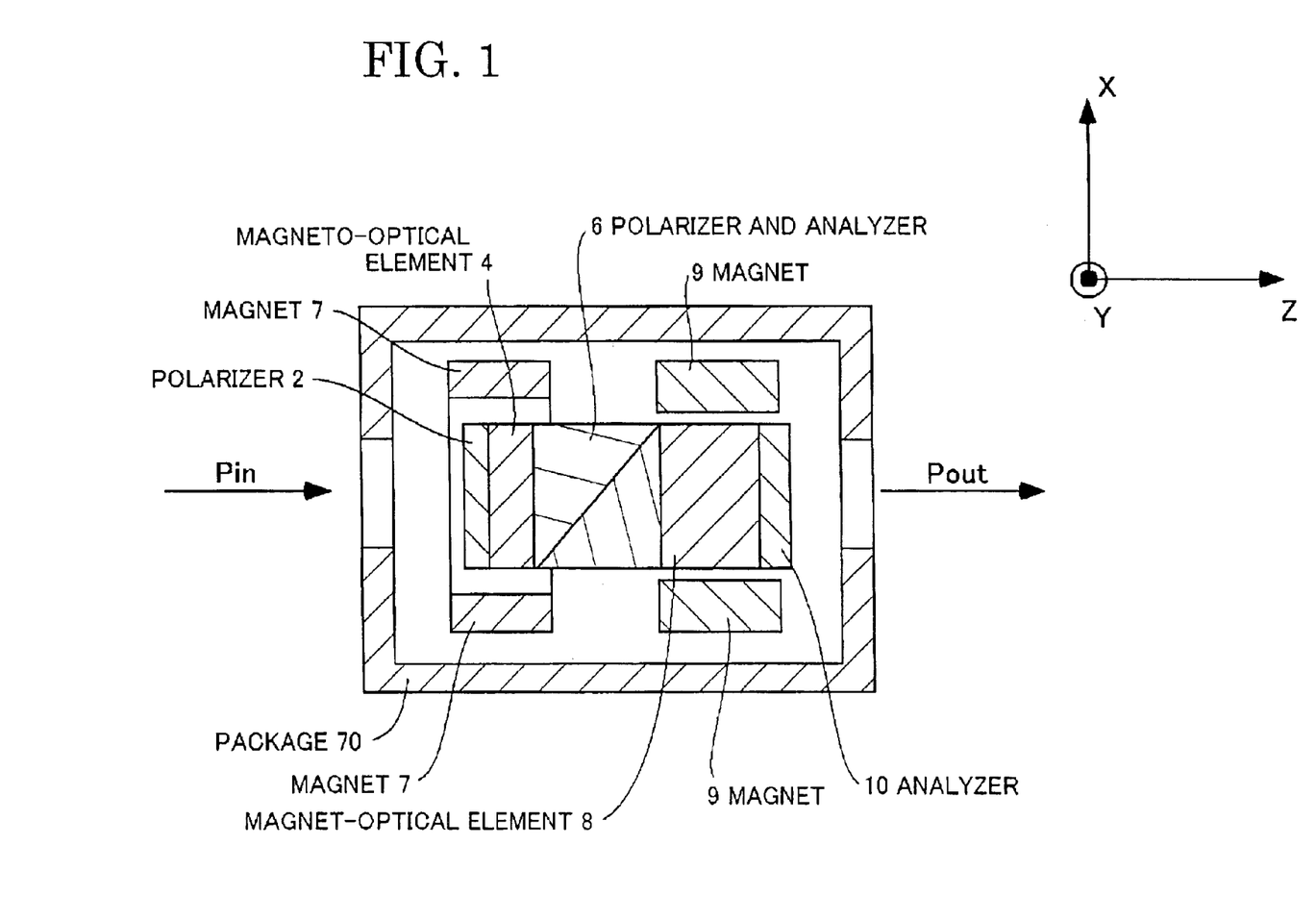
FIG. 1 is a partially cross-sectional view of the entire integrated magneto-optical modulator with optical isolator of the present invention.
Figure 2:
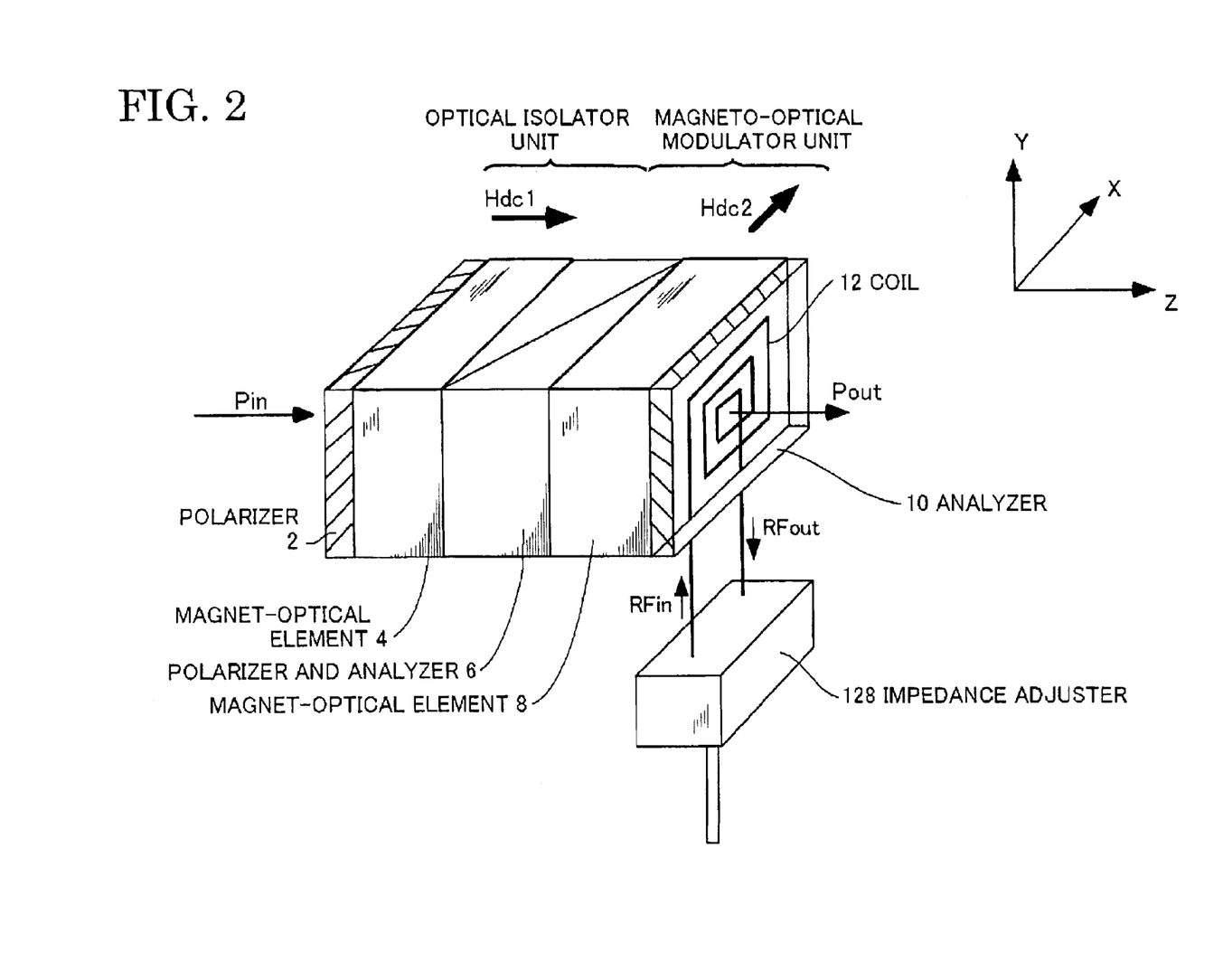
FIG. 2 is a perspective view of a main part including the optical isolator unit and the magneto-optical modulator unit of the first embodiment of the integrated magneto-optical modulator with optical isolator.

Hereinafter, the first embodiment of the present invention will be described, referring to FIGS. 1 and 2. FIG. 1 is a partially cross-sectional view of the entire integrated magneto-optical modulator with optical isolator of the present invention. FIG. 1 shows a sectional scheme of an overhead view of the integrated magneto-optical modulator with optical isolator. FIG. 2 is a perspective view of a main part including the optical isolator unit and the magneto-optical modulator unit of the first embodiment of the integrated magneto-optical modulator with optical isolator.

Referring to FIG. 2, the operation of the integrated magneto-optical modulator with optical isolator will be described. The light beam Pin is linearly polarized by polarizer 2. The incident light Pin is loosely focused by a certain lens so that the beam diameter can be almost minimized at a coil 12 which is formed on the latter part of magneto-optical element 8. Only the linear polarization component of the light beam Pin is outputted from the polarizer 2 to magnet-optical element 4 for the optical isolation. The magneto-optical element 4 may be made of any ferromagnetic material having Faraday effect such as YIG ($Y_3Fe_5O_{12}$) bulk crystal and Bi substituted garnet thick film. Especially, Bi substituted garnet crystal can accomplish a thinner crystal film of the magnet optic element 4 because of more effective Faraday effect per unit length.

The polarization of the light beam is rotated by a predetermined angle due to Faraday effect during propagating through the inside of the magnet-optic element 4. The light propagation distance and the strength of the applied magnetic field inside of the magneto-optical element 4 are adjusted, and the magneto-optical element 4 is set to rotate the light polarization by the desired angle. The outputted light from the magneto-optical element 4 is inputted into an analyzer and polarizer 6 which has the functions of both an analyzer of the optical isolator and a polarizer of the magneto-optical modulator. It is possible to arrange dual-stage sets (one set consists of polarizer 2, magneto-optical element 4, and analyzer and polarizer 6) in order to improve the isolation ratio of the optical isolator unit. The polarization beam splitter may be used for the analyzer and polarizer 6 according to the magnet for the bias magnetic field. Moreover, the magneto-optical element 8 may be Bi substituted garnet crystal which can accomplish a thinner crystal film.

The light beam is transmitted through the analyzer and polarizer 6 and the magneto-optical element 8 in the magneto-optical modulator unit, the center part of the coil 12 that is the high-frequency magnetic field generator, and the analyzer 10, and then the analyzer 10 outputs the output light Pout which is modulated to the desired signal intensity.

In order to apply the high-frequency magnetic field, the coil pattern is arranged on the surface of magneto-optical element 8. The coil pattern of the coil 12 is shown as a whirlpool winding pattern of the square in FIG. 2, while it may be an usual helicoidal pattern. The coil 12 is arranged only on the one side of the magneto-optical element 8 in FIG. 2, while it may be arranged on the both sides. In that case of using the coils on the both sides, it is possible to increase high-frequency magnetic field strength applied to magneto-optical element 8 to twice or more. The diameter in innermost of coil 12 should be as small as possible, and slightly larger than the transmission beam diameters to increase the high-frequency magnetic field strength. The diameter in innermost of the coil 12 depends on the beam diameter of the transmission light through the magneto-optical element 8 (or, depending on the utilized optical system). For instance, it is appropriate that its value is set within a range from 10 to several hundreds micrometers when this integrated magneto-optical modulator with optical isolator is used for the communication.

The bias magnetic field Hdc1 in the optical isolator unit is applied in almost parallel to the light propagation direction (almost along the direction of the Z axis in FIG. 2) with a permanent magnet. On the other hand, the bias magnetic field Hdc2 in the magneto-optical modulator unit is applied along the almost perpendicular direction to the light propagation direction (almost along the direction of X axis in FIG. 2) with a permanent magnet. In FIG. 2, permanent magnets generating the bias magnetic fields are not shown for the purpose of making the drawing more comprehensive.

FIG. 1 shows that a single package contains both the optical isolator unit and the magneto-optical modulator unit. In FIG. 1, the optical isolator unit and the magneto-optical modulator unit are arranged in face-to-face contact fashion, and they are contained in a single package 70. In FIG. 1, magnets 7 and 9 are also shown. The magnet 7 is a bias magnetic field generator that generates the bias magnetic field Hdc1 in the optical isolator unit, and the magnet 9 is a bias magnetic field generator that generates the bias magnetic field Hdc2 in the magneto-optical modulator unit. The bias magnetic field generators may be electromagnets or permanent magnets such as SmCo and NdFeB. Here, the bias magnetic fields are applied with permanent magnets 7 and 9. Any set of the applied direction and the strength of the bias magnetic fields are possible if the Faraday rotation angle is almost 0±90×n (n is an integer)° in the magneto-optical element 8. The bias magnetic field Hdc2 may be oriented in angle within a range of approximately ±30° with respect to the most effective angles.

The impedance adjuster 128 is arranged between the coil 12 and the drive circuit of the magneto-optical modulator, and adjusts the impedance to effectively introduce the high-frequency signal for light modulation from the drive circuit into the coil 12. Using the integrated magneto-optical modulator with optical isolator of the first embodiment, the isolation ratio could be approximately 30 dB (this value is correspondent to the reverse feedback light transmittance 0.1%.) in the optical-isolator unit, the modulation frequency could be within a range from DC to approximately 3 GHz, and no reflected feedback light is observed toward the light source or the semiconductor laser.

Furthermore, there arises no frequency resonance of one hundred MHz to a few hundreds MHz arising in case of applying no bias magnetic field, and the modulation frequency could be within a range from DC to approximately 3 GHz. In addition, the integrated magneto-optical modulator with optical isolator of the first embodiment comprises the optical isolator unit and the magneto-optical modulator unit which are arranged in face-to-face contact fashion, however, it is not necessary for them to be arranged in face-to-face contact fashion if they are contained in the same package.

<Second Embodiment>

Figure 3:
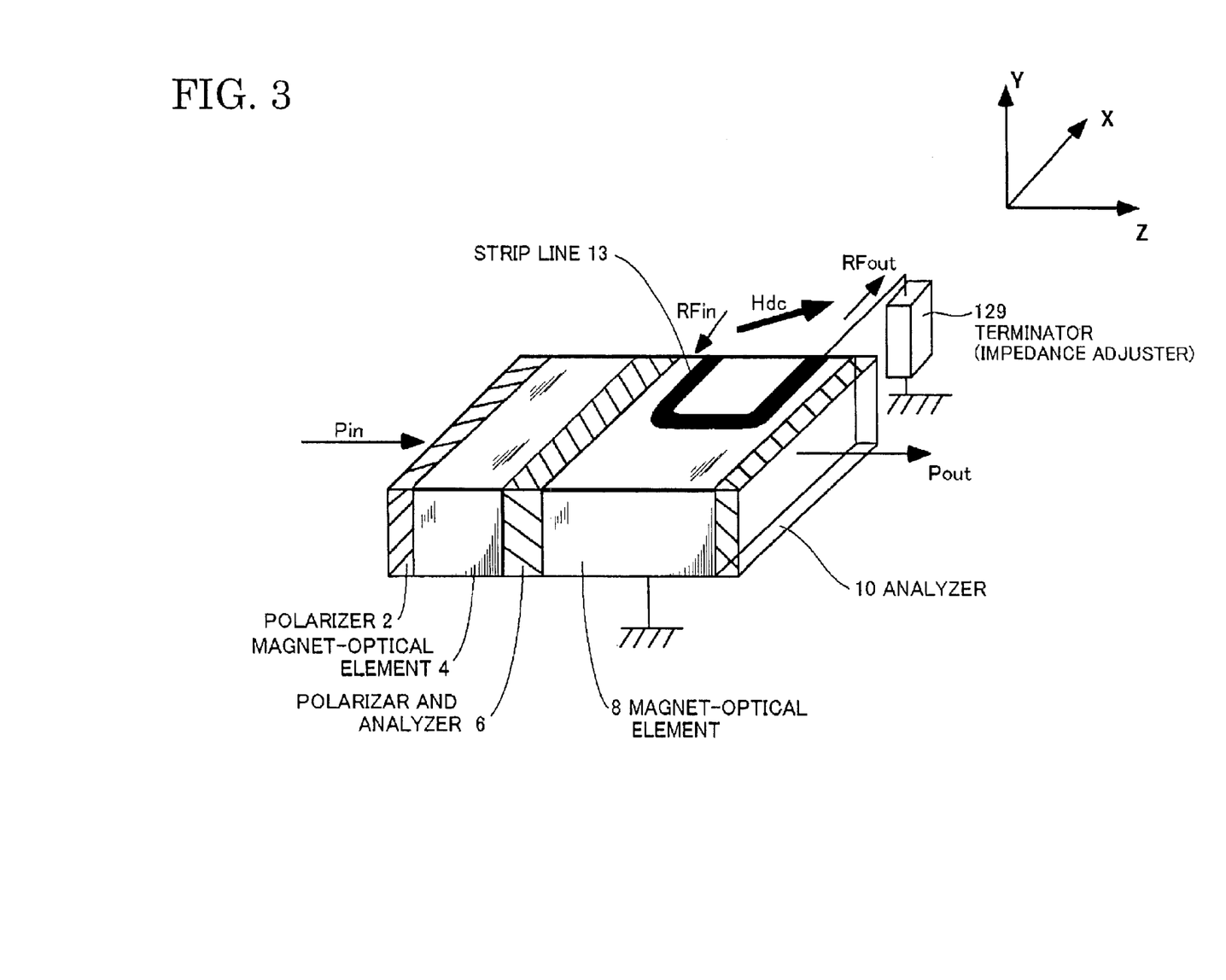
FIG. 3 is a perspective view of a main part including the optical isolator unit and the magneto-optical modulator unit of the second embodiment of the integrated magneto-optical modulator with optical isolator.

Next, the second embodiment of the present invention will be described, referring to FIG. 3. FIG. 3 is a perspective view of a main part including the optical isolator unit and the magneto-optical modulator unit of the second embodiment of the integrated magneto-optical modulator with optical isolator. The main differences between the first embodiment and the second embodiment are the direction applying the bias magnetic field and the high-frequency field generator for applying the high-frequency magnetic field. Moreover, thin glass polarizer is used as polarizer 2, polarizer and analyzer 6, and analyzer 10 here in order to shorten optical path length (path length from the injection part of the incident light Pin to the outgoing part of the radiation light Pout) of the entire element.

In FIG. 3, the bias magnetic field Hdc is applied to the optical isolator unit and the magneto-optical modulator unit. With one permanent magnet (not shown in FIG. 3) as a bias magnetic field generator, the bias magnetic field Hdc is applied along the direction of 45° from the optical propagation direction (along the direction of 45° from the Z axis toward X axis in the Z-X plane in FIG. 3). That is, the same are the bias magnetic field generators that generate the bias magnetic fields in both of the optical isolator unit and the magneto-optical modulator unit. The direction of the bias magnetic field Hdc may be oriented in angle within a range of approximately 45°±30° with respect to the optical propagation direction in the Z-X plane, Z-Y plane, or any one of the planes that includes Z axis. However, the path length of the light propagating through the magneto-optical element 4 should be designed so that the Faraday rotation angle has to be fixed at 45°.

The high-frequency field can be also applied with the distributed constant line as high-frequency magnetic field generator 13. The distributed constant line includes the strip line (the micro strip line is also included) and the coplanar line, and the strip line 13 is used as a high-frequency magnetic field generator in FIG. 3. The high frequency magnetic field generated by the strip line 13 has a direction component perpendicular to the flow direction of the high-frequency current of the strip line 13. Therefore, the magnetization of the magneto-optical element 8 in the magneto-optical modulator unit is directed to the direction where the bias magnetic field Hdc and high-frequency magnetic field $H_{RF}$ are synthesized (in this case, the rotation of the magnetization occurs) when the electric current is thrown into the strip line 13 and the high-frequency magnetic field is applied. The Faraday rotation angle would be change depending on the magnetization direction, and the variation of the light intensity could be obtained corresponding to the variation of the high-frequency magnetic field. Moreover, the high-frequency current is terminated at the end of the strip line 13 by the terminator (impedance adjuster 129) for impedance matching in order to efficiently transmit the high-frequency signal from the drive circuit in the magneto-optical modulator unit. Therefore, in this case, the impedance adjuster 129 is connected to the strip line 13 and the impedance adjustment is executed by the strip line 13 and the terminator 129. Moreover, in order to efficiently modulate the light beam in the magneto-optical modulator unit, it is preferable that the beam is thinned at several tens of micrometers right under the strip line 13 and passes as closely as possible to the strip line 13.

Using the integrated magneto-optical modulator with optical isolator of the first embodiment, the isolation ratio could be approximately 30 dB (this value is correspondent to the reverse feedback light transmittance 0.1%.), the modulation frequency could be within a range from DC to approximately 10 GHz. In addition, in case of applying the digital signal to the magneto-optical modulator unit, the modulation speed could be within a range from DC to approximately 2.5 Gbps or 10 Gbps. The noise of the reflected feedback light toward the light source or the semiconductor laser could not be observed and the bit error rate does not increase.

<Third Embodiment>

Next, the third embodiment of the present invention will be described, referring to FIGS. 4A–4E. FIGS. 4A–4E are schematic views for describing the first step to the fifth step of the manufacturing process of the integrated magneto-optical modulator with optical isolator that comprises the optical isolator and the magneto-optical modulator on the same substrate, respectively.

Figure 4A:
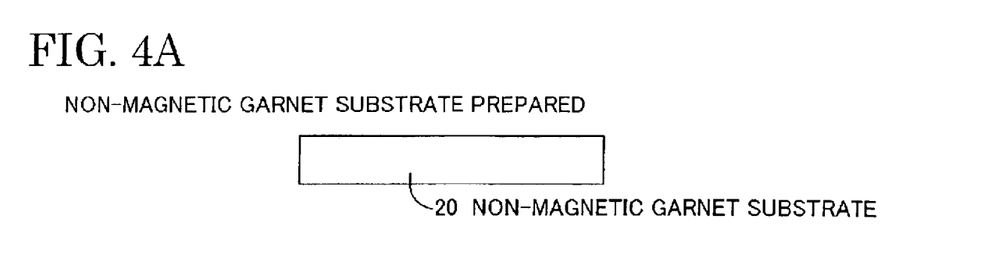
FIG. 4A is a schematic view for describing the first step of the manufacturing process of the integrated magneto-optical modulator with optical isolator that comprises the optical isolator and the magneto-optical modulator on the same substrate.

At first, non-magnetic garnet substrate 20 is prepared as shown in FIG. 4A. As the non-magnetic garnet substrate 20, it is preferable to use the crystal whose lattice constant resembles that of the magneto-optical element (garnet crystal) grown on this substrate 20. For example, GGG ($Gd_3Ga_5O_{12}$) or Ca—Mg—Zr substituted GGG can be used.

Figure 4B:
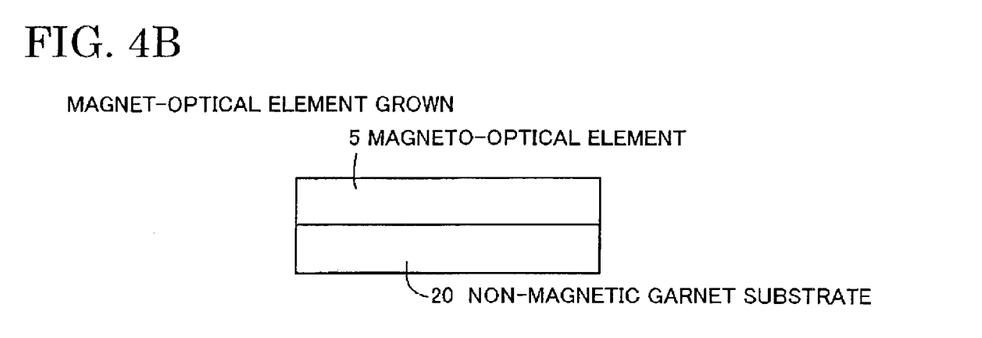
FIG. 4B is a schematic view for describing the second step of the manufacturing process of the integrated magneto-optical modulator with optical isolator that comprises the optical isolator and the magneto-optical modulator on the same substrate.

Next, the magneto-optical element is grown on the non-magnetic garnet substrate 20 by epitaxial method as shown in FIG. 4B. As epitaxial method, for instance, it is possible to use liquid phase epitaxial grow method in which the growth rate is rapid. Various garnet crystals 5 can be used as a magneto-optical element, however, Bi substituted rare earth iron garnet, or $(BiR)_3(FeGa)_5O_{12}$ [R is rare-earth element] is used here because the angle variation of the Faraday rotation per unit length is larger.

Figure 4C:
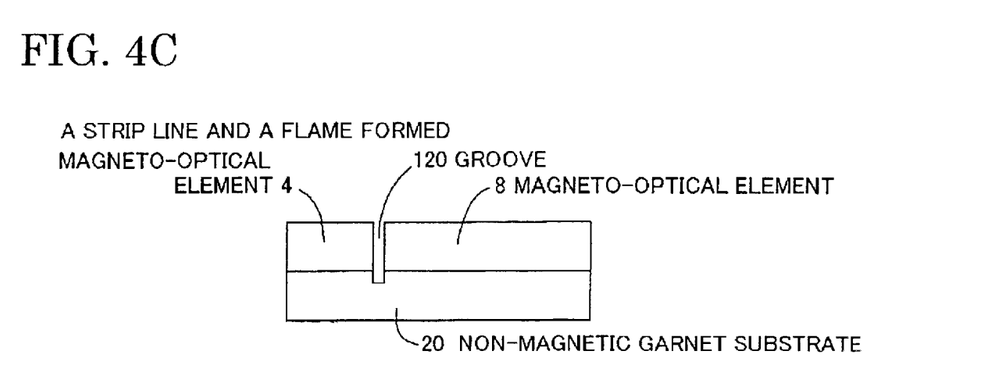
FIG. 4C is a schematic view for describing the third step of the manufacturing process of the integrated magneto-optical modulator with optical isolator that comprises the optical isolator and the magneto-optical modulator on the same substrate.

Next, the garnet crystal is grown to the film of the desired thickness. And then, the garnet crystal is cut out to a necessary size as an element by using a precise rotary blade saw (in general, it is called a dicing saw) as shown in FIG. 4C. For example, the #400–#2000 diamond blade can be used for cutting out blade, and the cutting rates can be 0.1–5.0(mm/second). The groove is formed at the same time as the above cutting out. This groove is for inserting the analyzer and polarizer 6 and divides the garnet crystal 5 into a part of the magneto-optical element 4 and a part of the magneto-optical element 8. It is preferable in principle that the light transmission surfaces of polarizer 2, polarizer and analyzer 6, and analyzer 10 are basically oriented in angle of 90° with respect to the light transmission direction, respectively. However, it is also possible that they are oriented in angle within a range of 90°±10° with respect to the light transmission direction in order to suppress the influence of light reflection on these surfaces. In other words, the groove 120 can be formed so that the direction of the groove 120 is oriented in angle within a range of 90°±10° with respect to the light transmission direction, and the magneto-optical element 5 can be polished so that the direction of the edge surface of the magneto-optical element 5 is oriented in angle within a range of 90°±10° with respect to the light transmission direction. It will be called that the light transmission surface is almost perpendicular to the light transmission direction when the light transmission surface is oriented in angle within a range of 90°±10° with respect to the light transmission direction.

Figure 4D:
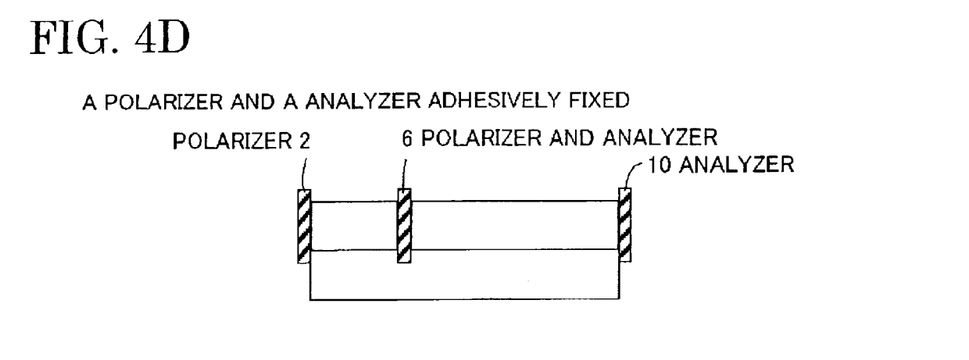
FIG. 4D is a schematic view for describing the fourth step of the manufacturing process of the integrated magneto-optical modulator with optical isolator that comprises the optical isolator and the magneto-optical modulator on the same substrate.

Next, the analyzer and polarizer 6 is inserted in the groove 120 and the polarizer 2 and the analyzer 10 are adhesively fixed to the position in which the incident light Pin and the outgoing light Pout are transmitted, respectively, as shown in FIG. 4D.

Figure 4E:
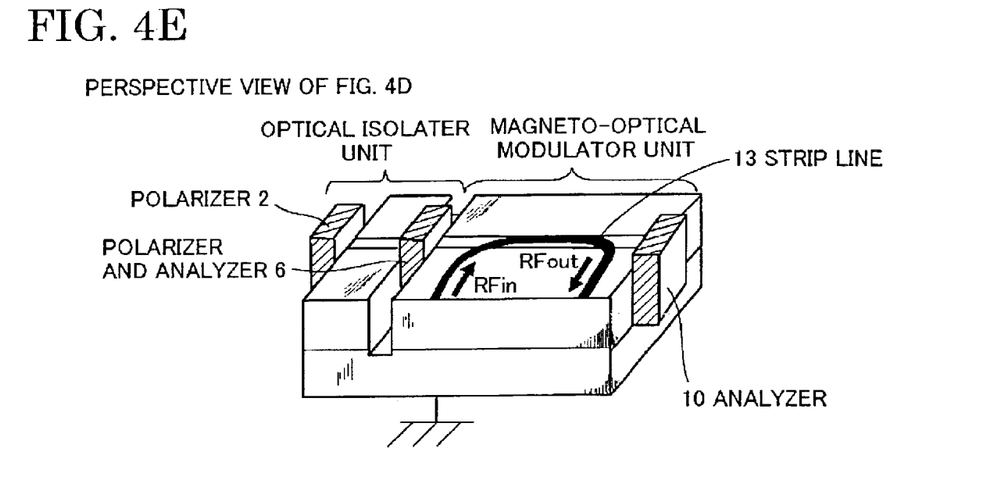
FIG. 4E are schematic views for describing the fifth step of the manufacturing process of the integrated magneto-optical modulator with optical isolator that comprises the optical isolator and the magneto-optical modulator on the same substrate.

Next, the high-frequency magnetic field generator (strip line 13) is formed on the surface of the assumed magneto-optical element 8, and the ground electrode is formed on the surface of the back-side of the substrate as shown in FIG. 4E.

According to the above-mentioned process of manufacture, the integrated magneto-optical modulator with optical isolator can be formed just inserting analyzer and polarizer 6 into the groove 120. Therefore, polish of the edge and various adjustment such as adjustment of optical axis can be simplified remarkably or no-needed. Although only analyzer and polarizer 6 is inserted into the groove 120 in FIG. 4D, it is possible to form the grooves to insert the polarizer 2 and the analyzer 10, and to insert them in each of the grooves. The integrated magneto-optical modulator with optical isolator that the optical isolator unit and the magneto-optical modulator unit are arranged on the same substrate can be easily manufactured by doing as mentioned above.

The bias magnetic field is applied to the element made by the above-mentioned process. The direction of the bias magnetic field is the same as described in the third embodiment. In addition, the high-frequency signal is provided from the high-frequency signal source (not shown in the drawings) to high-frequency magnetic field generator 13. Furthermore, the terminator is arranged on the opposite end of high-frequency magnetic field generator 13, and all of the impedance of high-frequency signal source, high-frequency magnetic field generator 13, and the terminator is set to be the same value, for example 50Ω. The terminator is omitted to be shown in FIG. 4E. In the above-mentioned structure, it is possible to modulate the transmitted light by extending to wideband (from DC to 10 GHz) by using the strip line of the distributed constant type as a high-frequency magnetic field generator. In this case, the upper limited frequency depends on the frequency response of the high-frequency signal source or another signal processing device. Using the integrated magneto-optical modulator with optical isolator of the above-mentioned structure, the isolation ratio could be also approximately 30 dB (this value is correspondent to the reverse feedback light transmittance 0.1%.) in the optical isolator unit, and no reflected feedback light is observed toward the light source or the semiconductor laser.

<Fourth Embodiment>

Figure 5:
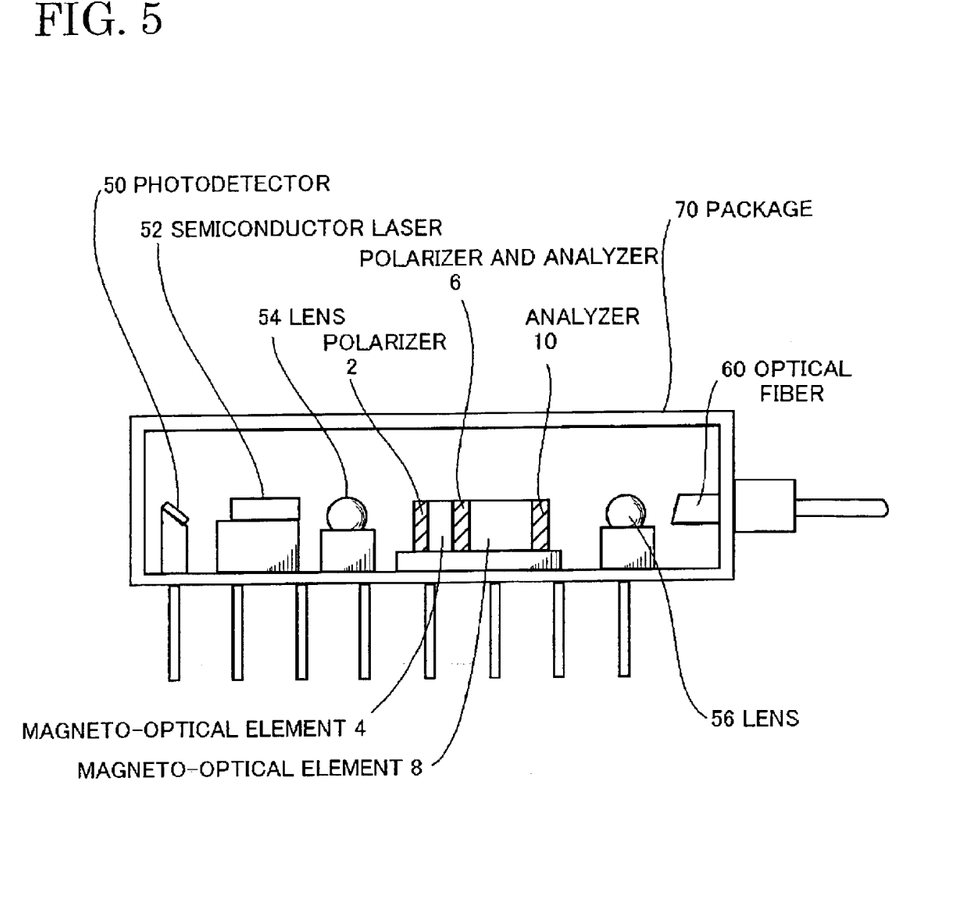
FIG. 5 is a perspective view showing that the light source, the optical isolator unit, and the magneto-optical modulator are contained in the same package.

Next, the fourth embodiment of the present invention will be described, referring to FIG. 5. FIG. 5 is a perspective view showing that the light source, the optical isolator unit, and the magneto-optical modulator are contained in the same package. In FIG. 5, a semiconductor laser is used as the light source 52. The light from the light source 52 is transmitted through the lens 54, and the integrated magneto-optical modulator with optical isolator that has the optical isolator unit and the magneto-optical modulator unit. As the integrated magneto-optical modulator with optical isolator, for example, any one of the compositions shown in FIGS. 2 and 3 can be used. The lens 54 is adjusted to loosely focus the light so that the beam diameter can be almost minimized at a certain spot, for example right under of the strip line. The lens 56 is arranged to efficiently couple the outputted light Pout from the magneto-optical modulator unit at one end of the optical fiber 60.

The photodetector 50 detects the light that leaks from the semiconductor laser 52 to the opposite side of the proper light direction, and monitors the light emitting power of the semiconductor laser 52. The device with a single package 70 reliably has an excellent operation because all of the above-mentioned elements is fixed to the same package 70 by gluing, soldering, and welding. The magnet to apply the bias magnetic field and the impedance adjuster are not shown in FIG. 5 because of making the drawing more comprehensible. The light transmission was tested by using the above-mentioned device with a single package 70, and the modulation frequency could be within a range from DC to approximately 10 GHz. In addition, in case of applying the digital signal to the magneto-optical modulator unit, the modulation speed could be within a range from DC to approximately 2.5 Gbps or 10 Gbps. The noise of the reflected feedback light toward the light source or the semiconductor laser could not be observed and the bit error rate does not increase.

A performance quite similar to the above-mentioned can be also obtained when the drive circuit of the light source 52 and the magneto-optical modulator unit, in addition to the light source, the optical isolator unit, and the magneto-optical modulator unit, are contained in the same package 70. In this case, there is a further advantage of easily shielding an unnecessary radiation etc. owing to containing all components including the drive circuit in the same package 70. The package 70 also can contain either the drive circuit of the semiconductor laser or the drive circuit of the magneto-optical modulator. The package 70 also can contain the impedance adjuster to adjust the impedance of the drive circuit of the magneto-optical modulator unit.

<Fifth Embodiment>

Figure 6:
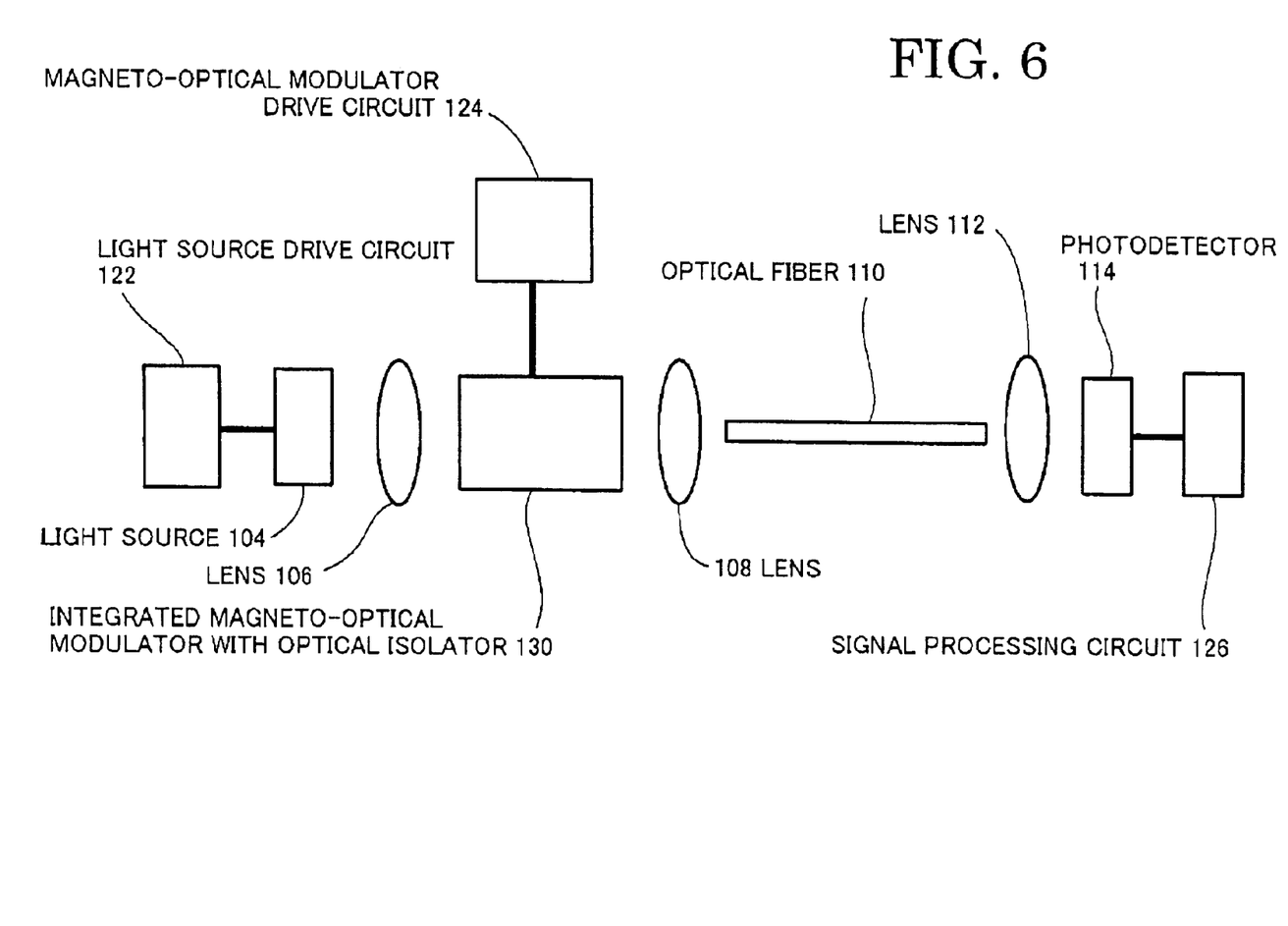
FIG. 6 is a perspective view showing the composition of the optical communication system of the present invention.

Next, the fifth embodiment of the present invention will be described, referring to FIG. 6. FIG. 6 is a perspective view showing the composition of the optical communication system of the present invention. Being controlled by the drive circuit 122 of the light source 104, the light source 104 operates to emit a proper intensity of light. The emitted light from the light source 104 becomes loosely focused beam or parallel beam through the lens 106, and this beam is injected to the integrated magneto-optical modulator with optical isolator 130. On the other hand, the modulating signal is supplied to the integrated magneto-optical modulator with optical isolator 130 by the magneto-optical modulator drive circuit 124. According to this modulating signal, light is modulated in the magneto-optical modulator unit of the integrated magneto-optical modulator with optical isolator 130. Light is modulated to the desired intensity during propagating through the integrated magneto-optical modulator with optical isolator 130. The modulated light is outputted from the integrated magneto-optical modulator with optical isolator 130, and outputted light is focused by the lens 108 so that light beam is coupled at one end of the optical fiber 110.

And then, light propagates through the optical fiber 110. The outputted light from another end of the optical fiber 110 is transmitted through the lens 112, and is detected by the photodetector 114. The photodetector 114 converts the received optical signal into the electrical signal, and supplies the electrical signal to the signal processing circuit 126. Signal processing circuit 126 executes the signal decoding process etc., and the desired information is taken out. As the integrated magneto-optical modulator with optical isolator, for example, any one of the compositions shown in FIGS. 3 and 4 can be used. Therefore, the integrated magneto-optical modulator with optical isolator 130 has the ability of the high speed response. As it has the optical isolator unit between the light source and the magneto-optical modulator unit, the noise of the reflected feedback light toward the light source is not observed, and the signal with more than the frequency 10 GHz can be transmitted through the optical fiber 110 of the distance of tens or more km.

Moreover, for example, the electrical signal from the antenna or the amplification signal of it can be used as a high-frequency signal by which the high-frequency magnetic field generator generates the high-frequency magnetic field. For example, the communication system can be achieved, which has the ability of receiving the radio signal of mobile communication system due to the antenna, modulating and generating the light according to the received signal, and propagating the signal to the office via the optical fiber. In this case, although the integrated magneto-optical modulator with optical isolator of the present invention may be in outdoor, it does not have such disadvantages as the DC drift, and operates stably in even outdoor where the temperature variation is large.

What is claimed is:

1. An integrated magneto-optical modulator with optical isolator comprising:

an optical isolator unit for rotating a polarization of an incident light from a light source to transmit the light with rotated polarization, and for eliminating a reflected feedback light toward the light source;

a magneto-optical modulator unit for modulating an intensity of the light from the optical isolator unit and transmitting the modulated light outside;

an impedance adjuster for adjusting an electrical impedance in order to effectively introduce a high-frequency signal for light modulation to the magneto-optical modulator unit; and a single package for containing the optical isolator unit and the magneto-optical modulator unit.

2. The integrated magneto-optical modulator with optical isolator according to claim 1, wherein a modulation frequency at the magneto-optical modulator unit is equal to or greater than 100 MHz.

3. The integrated magneto-optical modulator with optical isolator according to claim 1, wherein a modulation speed at the magneto-optical modulator unit is equal to or greater than 2.5 Gbps.

4. The integrated magneto-optical modulator with optical isolator according to claim 1, wherein an analyzer of the optical isolator unit and a polarizer of the magneto-optical modulator unit consist of a same optical component.

5. The integrated magneto-optical modulator with optical isolator according to claim 1, wherein a direction of a bias magnetic field, which is applied to a magneto-optical element in the magneto-optical modulator unit, is a range of 90°±30° with respect to a light propagation direction, and wherein a direction of a high-frequency magnetic field, which is applied to a magneto-optical element in the magneto-optical modulator unit, is a range of 0°±30° with respect to the light propagation direction.

6. The integrated magneto-optical modulator with optical isolator according to claim 1, wherein a direction of a bias magnetic field, which is applied to a magneto-optical element in the magneto-optical modulator unit, is a range of 45°±30° with respect to a light propagation direction, and wherein a direction of a high-frequency magnetic field, which is applied to a magneto-optical element in the magneto-optical modulator unit, is a range of 90°±30° with respect to the light propagation direction.

7. The integrated magneto-optical modulator with optical isolator according to claim 6, wherein a high-frequency magnetic field generator generating the high-frequency magnetic field is a distributed constant line.

8. The integrated magneto-optical modulator with optical isolator according to claim 5, wherein the bias magnetic field is applied to the magneto-optical element in the magneto-optical modulator unit so that a polarization of the light can be rotated by $\{(0\pm 90)\times n\}°$ (n is an integer) due to a Faraday effect when the light passes through the magneto-optical modulator unit.

9. The integrated magneto-optical modulator with optical isolator according to claim 5, wherein a bias magnetic field generator for applying the bias magnetic field to the magneto-optical element in the magneto-optical modulator unit and a bias magnetic field generator for applying a bias magnetic field to a magneto-optical element in the optical isolator unit consist of a same magnetic field generator.

10. The integrated magneto-optical modulator with optical isolator according to claim 1, wherein a magneto-optical element in the magneto-optical modulator unit and a magneto-optical element in the optical isolator unit are arranged on a same substrate.

11. The integrated magneto-optical modulator with optical isolator according to claim 10, wherein the magneto-optical elements are made of Bi substituted rare earth iron garnet.

12. The integrated magneto-optical modulator with optical isolator according to claim 1, wherein a plane of polarization of the light outputted from the optical isolator unit and a plane of polarization of the light inputted to the magneto-optical modulator unit are corresponding.

13. The integrated magneto-optical modulator with optical isolator according to claim 1, wherein the optical isolator unit consists of dual-stage isolators.

14. The integrated magneto-optical modulator with optical isolator according to claim 1, wherein the single package contains the light source.

15. The integrated magneto-optical modulator with optical isolator according to claim 14, wherein the light source is a semiconductor laser.

16. The integrated magneto-optical modulator with optical isolator according to claim 14, wherein at least a either drive circuit of the light source and the magneto-optical modulator unit is contained in the single package. magneto-optical modulation drive circuit.

17. An optical communication system comprising:

a light source for inputting a light into the optical isolator;

a light source drive circuit for driving the light source;

an optical isolator unit for rotating a polarization of an incident light from the light source and transmitting the light with rotated polarization, while for eliminating a reflected feedback light toward the light source;

a magneto-optical modulator unit for modulating an intensity of the light from the optical isolator unit and transmitting the modulated light outside;

a magneto-optical modulation drive circuit for processing a high-frequency signal for light modulation at the magnet-optical modulator unit;

an impedance adjuster for adjusting an electrical impedance in order to effectively introduce a high-frequency signal for light modulation to the magneto-optical modulator unit;

an optical fiber for propagating an outputted light from the magneto-optical modulator unit;

a photodetector for detecting the light propagating through the optical fiber; and a signal processing circuit for executing the signal decoding process to take out the desired information from the optical signal of the received light by the photodetector.

18. The optical communication system according to claim 17, wherein the optical isolator unit and the magneto-optical modulator unit are contained in a single package.

19. The optical communication system according to claim 18, wherein the light source is contained in the package.

20. The optical communication system according to claim 17, further comprising an antenna for receiving a radio signal and supplying the signal to the magneto-optical modulation drive circuit, and wherein the magneto-optical modulator unit modulates the light depending on the signal processed by the magneto-optical modulation drive circuit.

* * * * *